(12) United States Patent
Matsuoka et al.

(10) Patent No.: US 12,276,868 B2
(45) Date of Patent: Apr. 15, 2025

(54) OPHTHALMIC LENS

(71) Applicant: HOYA LENS THAILAND LTD., Pathumthani (TH)

(72) Inventors: Shohei Matsuoka, Tokyo (JP); Yuki Iguchi, Tokyo (JP); Hiroyuki Mukaiyama, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 690 days.

(21) Appl. No.: 17/622,049

(22) PCT Filed: Jul. 10, 2020

(86) PCT No.: PCT/JP2020/026941
§ 371 (c)(1),
(2) Date: Dec. 22, 2021

(87) PCT Pub. No.: WO2021/059673
PCT Pub. Date: Apr. 1, 2021

(65) Prior Publication Data
US 2022/0269108 A1 Aug. 25, 2022

(30) Foreign Application Priority Data
Sep. 26, 2019 (JP) ................. 2019-174954

(51) Int. Cl.
*G02C 7/02* (2006.01)
*G02B 9/10* (2006.01)

(52) U.S. Cl.
CPC ............... *G02C 7/022* (2013.01); *G02B 9/10* (2013.01); *G02C 2202/24* (2013.01)

(58) Field of Classification Search
CPC .... G02C 7/022; G02C 2202/24; G02C 7/041; G02C 2202/16; G02C 7/06; G02C 7/04;
(Continued)

(56) References Cited

U.S. PATENT DOCUMENTS

| 5,859,685 A | 1/1999 | Gupta |
| 2008/0088793 A1 | 4/2008 | Sverdrup et al. |
| 2013/0250235 A1 | 9/2013 | Foulds et al. |
| 2017/0131567 A1 | 5/2017 | To et al. |

FOREIGN PATENT DOCUMENTS

| JP | H029912 A | * | 4/1990 | ............... G02B 1/04 |
| JP | H0299912 A | | 4/1990 | |

(Continued)

OTHER PUBLICATIONS

Anonymous, "Teildispersion—Wikipedia", XP093085074, Retrieved from the Internet: URL: https://de.wikipedia.org/wiki/teildispersion [retrieved on Sep. 22, 2023], Aug. 24, 2013, 1 page.

(Continued)

*Primary Examiner* — James C. Jones
(74) *Attorney, Agent, or Firm* — Oliff PLC

(57) ABSTRACT

Provided are an ophthalmic lens and a technique related thereto, the ophthalmic lens including two lens elements 1 and 2 having powers with different signs, in which when the Abbe number (e-line reference) of the lens element 1 having a power with a smaller absolute value is $v_{e1}$, and the Abbe number (e-line reference) of the other lens element 2 is $v_{e2}$, Formula 1 below is satisfied, and $$v_{e1} < v_{e2} \qquad \text{(Formula 1)}$$

when a partial dispersion ratio $P_{gF'1}$ between the g-line and F'-line in the lens element 1 having the power with the smaller absolute value, and a partial dispersion ratio $P_{gF'2}$ between the g-line and F'-line in the other lens element 2 are set, the following Formula 2 is satisfied.

$$P_{gF'1} > P_{gF'2} \qquad \text{(Formula 2).}$$

5 Claims, 4 Drawing Sheets

SECOND LENS ELEMENT

FIRST LENS ELEMENT

(58) Field of Classification Search
CPC ........ G02B 9/10; G02B 27/0062; G02B 3/00; G02B 27/005; G02B 13/00; B29D 11/00009; B29D 11/00326; B29D 11/0073
See application file for complete search history.

(56) References Cited

FOREIGN PATENT DOCUMENTS

| | | |
|---|---|---|
| JP | 2001509276 A | 7/2001 |
| WO | 2012044256 A1 | 4/2012 |
| WO | 2018152596 A1 | 8/2018 |

OTHER PUBLICATIONS

Datenblätter, "Optisches Glas", XP055176798, Retrieved from the Internet: URL:http://www.schott.com/advanced_optics/german/abbe_datasheets/Schott_datasheet_all_german.pdf [Retrieved on Mar. 16, 2015] * page for F5; page for N-SK14; p. 3, section "Relative Teildispersion" *, Apr. 25, 2013, 126 pages.
EP20868972.9, "Extended European Search Report", Oct. 6, 2023, 15 pages.
PCT/JP2020/026941, "English Translation of International Search Report", Oct. 6, 2020, 3 pages.
PCT/JP2020/026941, "International Preliminary Report on Patentability", Apr. 7, 2022, 6 pages.

* cited by examiner

FIG. 1(a)
FIG. 1(b)
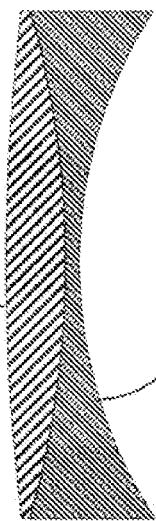
FIRST LENS ELEMENT
SECOND LENS ELEMENT
COMPARATIVE EXAMPLE 1
WORKING EXAMPLES 1 & 2

OPHTHALMIC LENS

CROSS-REFERENCE TO RELATED APPLICATIONS

This application is the National Stage of International Application No. PCT/JP2020/026941, filed Jul. 10, 2020, which claims priority to Japanese Patent Application No. 2019-174954, filed Sep. 26, 2019, and the contents of which is hereby incorporated by reference.

TECHNICAL FIELD

The present disclosure relates to an ophthalmic lens.

BACKGROUND ART

As the near-sighted population increases, so does the severely near-sighted population. It is well known that severe near-sightedness can lead to blindness. For this reason, an increase in severe near-sightedness is a serious social problem, and there is widespread demand for a treatment method for suppressing the progression of near-sightedness.

Several methods have been proposed to suppress the progression of near-sightedness leading to severe near-sightedness. Examples of optical near-sightedness progression suppressing methods include a method of using ophthalmic lenses such as eyeglasses or contact lenses (soft contact lenses, orthokeratology).

Patent Document 1 describes an eyeglass lens that exhibits an effect of suppressing the progression of refractive error such as near-sightedness (hereinafter also referred to as a near-sightedness progression suppressing effect) by adding later-described monochromatic aberration. This eyeglass lens is also referred to as a near-sightedness progression suppressing lens. Specifically, for example, a spherical minute convex portion having a diameter of about 1 mm is formed on the convex surface that is the object-side surface of the eyeglass lens.

A luminous flux, which is a bundle of light rays that are incident on the eyeglass lens and pass through a pupil due to light rays passing through the minute convex portions in the eyeglass lens described in Patent Document 1 (hereinafter, "luminous flux" is assumed to have the same meaning) is focused at a plurality of positions on the overfocus side in the optical axis direction relative to a predetermined position on the retina. This suppresses the progression of near-sightedness.

In the present specification, the overfocus side refers to the direction of approaching an object to be visually recognized in the optical axis direction using the retina as a reference, and the underfocus side refers to the opposite direction to the overfocus side, which is the direction away from the object to be visually recognized in the optical axis direction using the retina as a reference. If the optical power is excessively positive, the light is focused on the overfocus side, and if it is insufficient, the light is focused on the underfocus side.

On the other hand, Patent Document 2 describes longitudinal chromatic aberration in which light having a red wavelength is focused rearward of light having blue and green wavelengths ([0041] in Patent Document 2). Also, it is described that in animal testing, light having a red wavelength lengthens the eye axis and causes the progression of near-sightedness ([0008] and [0049] in Patent Document 2). It is described that, on the contrary, light having a blue wavelength has an effect of suppressing the progression of near-sightedness ([0054] in Patent Document 2).

Also, Patent Document 2 describes that light having blue and green wavelengths is used to suppress the progression of near-sightedness ([0035] in Patent Document 2). Specifically, it is described that an optical filter is provided on the eyeglass lens to form peaks of light intensity in a wavelength range of 460 to 490 nm and a wavelength range of about 490 to 550 nm, and to set the light intensity in the wavelength range of about 550 to 700 nm to 1% or less ([Claim 1], [Claim 5], [Claim 6], and [0032] of Patent Document 2).

Patent Document 3 discloses an ophthalmic lens system that controls longitudinal chromatic aberration so as to cause negative and/or inverted longitudinal chromatic aberration in the eye ([0002] in Patent Document 3). This ophthalmic lens system includes a first lens and a second lens ([0008] in Patent Document 3).

Patent Document 3 describes that a first lens and a second lens are selected such that when light passes through an ophthalmic lens system having a positive or zero power, the light on the long wavelength side is focused at a position close to the ophthalmic lens system ([0008] in Patent Document 3).

Patent Document 3 describes that when light passes through an ophthalmic lens system with a negative power, the first lens and the second lens are selected such that the light on the short wavelength side is focused at a position close to the ophthalmic lens system by making the absolute value larger than longitudinal chromatic aberration caused by the eye ([0008] in Patent Document 3).

CITATION LIST

Patent Documents

Patent Document 1: US Patent Application Laid-Open Publication No. 2017/0131567
Patent Document 2: WO 2012/044256 Pamphlet
Patent Document 3: WO 2018/152596 Pamphlet

SUMMARY OF DISCLOSURE

Technical Problem

The method described in Patent Document 2 relates to wavelength filtering. On the other hand, no consideration has been given to longitudinal chromatic aberration caused by the eyeglass lens itself. Longitudinal chromatic aberration depends on the prescription power. With the method described in Patent Document 2, there is a risk that no matter how much a wavelength is filtered, the near-sightedness progression suppressing effect cannot be exhibited unless the longitudinal chromatic aberration of the eyeglass lens itself is appropriately generated.

The method described in Patent Document 3 is that the first lens and the second lens constituting the ophthalmic lens system cause longitudinal chromatic aberration that changes the focus position of light of each wavelength. On the other hand, in the method described in Patent Document 3, the focus position of aluminous flux having a wavelength on the short wavelength side in the bundle of visible light rays that pass through the ophthalmic lens system and pass through the pupil moves to the overfocus side. At the same time, the focus position of a luminous flux having a wavelength on the long wavelength side moves to the underfocus side.

That is, the method described in Patent Document 3 can increase the near-sightedness progression suppressing effect and at the same time increase the factors that inhibit the near-sightedness progression suppressing effect (e.g., FIG. 63 of Patent Document 3).

One embodiment of the present disclosure aims to reduce the number of factors that inhibit an effect of suppressing the progression of near-sightedness or far-sightedness (hereinafter collectively referred to as a refractive error in the present specification), while exhibiting the suppressing effect due to longitudinal chromatic aberration.

Solution to Problem

The inventors of the present disclosure have focused on an ophthalmic lens constituted by a plurality of lenses as described in Patent Document 3. Then, they focused on an apochromat, which is used in microscopes and the like that are similarly constituted by multiple lenses.

An achromat, which is the predecessor of the apochromat, indicates C-d-F correction in which axial chromatic aberration for the C'-line (wavelength 644 nm), which is red wavelength light, and the F'-line (wavelength 480 nm), which is blue wavelength light, are corrected, and spherical aberration and coma aberration are minimized at the d-line (wavelength 588 nm), which is yellow wavelength light. This correction is also called "achromatization" and is a linear functional chromatic aberration correction.

Since an achromat corrects chromatic aberration only for light of two types of wavelength, chromatic aberration remains overall. This residual chromatic aberration is called a secondary spectrum.

Apochromat refers to correcting chromatic aberration of light of a wavelength of another color in addition to the red and blue wavelengths. Also, apochromat refers to reducing the above-described secondary spectrum. This correction is also called "superachromatization" and is a quadratic functional chromatic aberration correction.

Usually, in a microscope or the like, an apochromat aims to remove chromatic aberration. On the other hand, the inventors of the present disclosure have found that the technique of apochromat is applied to an ophthalmic lens according to one aspect of the present disclosure so as to increase chromatic aberration instead of removing it. Specifically, the inventors of the present disclosure have come up with a method of defining a partial dispersion ratio relationship that is different from that of the conventional apochromat between the g-line and the F'-line between the above-described plurality of lenses.

A first aspect of the present disclosure is
an ophthalmic lens including two lens elements 1 and 2 having powers with different signs,
in which when an Abbe number (e-line reference) of the lens element 1 having a power with a smaller absolute value is $\nu_{e1}$, and an Abbe number (e-line reference) of the other lens element 2 is $\nu_{e2}$, Formula 1 below is satisfied, and $$\nu_{e1} < \nu_{e2} \quad \text{(Formula 1)}$$

when a partial dispersion ratio $P'_{gF'1}$ between a g-line and an F'-line in the lens element 1 having the power with the smaller absolute value, and a partial dispersion ratio $P'_{gF'2}$ between a g-line and an F'-line in the other lens element 2 are set, Formula 2 below is satisfied.

$$P'_{gF'1} > P'_{gF'2} \quad \text{(Formula 2).}$$

A second aspect of the present disclosure is the aspect described in the first aspect, in which when the absolute value of the power of the lens element 1 is D1 and the absolute value of the power of the lens element 2 is D2, Formula 3 below is satisfied.

$$(D1/\nu_{e1}) < (D2/\nu_{e2}) \quad \text{(Formula 3)}$$

A third aspect of the present disclosure is the aspect described in the first or second aspect, in which when the absolute value of the power of the lens element 1 is D1 and the absolute value of the power of the lens element 2 is D2, Formula 4 below is satisfied.

$$\{D1 \times (1+3 \times P_{gF'1})/\nu_{e1}\} > \{D2 \times (1+3 \times P_{gF'2})/\nu_{e2}\} \quad \text{(Formula 4)}$$

A fourth aspect of the present disclosure is the aspect described in any one of the first to third aspects, in which the power of the lens element 1 is positive, and the power of the lens element 2 is negative.

A fifth aspect of the present disclosure is the aspect described in any one of the first to third aspects, in which the power of the lens element 1 is negative, and the power of the lens element 2 is positive.

A sixth aspect of the present disclosure is the aspect according to any one of the first to fifth aspects, including:

a first refractive region having a first refractive power obtained based on a prescription for correcting refractive error of an eye; and a plurality of second refractive regions that have a refractive power different from the first refractive power, and have a function of focusing on a position outside of a retina of the eye so as to suppress progression of the refractive error of the eye, in which the second refractive regions are formed as respective independent regions near a central portion of the ophthalmic lens, and the first refractive region is formed outside of the regions in which the second refractive regions are formed.

A seventh aspect of the present disclosure is the aspect according to any one of the first to sixth aspects, in which the ophthalmic lens is an eyeglass lens.

Another aspect of the present disclosure is as follows.

The power of the lens element 1 is positive, the power of the lens element 2 is negative, the prescription power of the ophthalmic lens is negative, and the ophthalmic lens is a minus lens.

Another aspect of the present disclosure is as follows.

The power of the lens element 1 is negative, the power of the lens element 2 is positive, the prescription power of the ophthalmic lens is positive, and the ophthalmic lens is a plus lens.

Another aspect of the present disclosure is as follows.

"An ophthalmic lens including two lens elements having powers with different signs, in which, for light with a wavelength on the long wavelength side in visible light, longitudinal chromatic aberration is set to near zero, and for light with a wavelength on the short wavelength side in visible light, longitudinal chromatic aberration is increased (due to a secondary spectrum), and the power is higher than the prescribed power."

Near zero refers to a state in which the absolute value of the power difference per 80 nm of the wavelength range is 0.01 D or less. This is a localization of the state in which the absolute value of the power difference in the wavelength range from the g-line to the C'-line is 0.02 D or less when the e-line is used as a reference.

Another aspect of the present disclosure is as follows.

Ophthalmic lenses exclude intraocular lenses (so-called IOLs). An ophthalmic lens is also referred to as a lens worn on the outside of the eyeball.

Advantageous Effects of Disclosure

According to one working example of the present disclosure, it is possible to reduce the number of factors that hinder the refractive error progression suppressing effect while exhibiting the suppressing effect due to longitudinal chromatic aberration.

BRIEF DESCRIPTION OF DRAWINGS

FIG. 1(a) is a schematic side cross-sectional view of a minus lens according to Comparative Example 1. FIG. 1(b) is a schematic side cross-sectional view of the minus lens for suppressing the progression of near-sightedness according to Working Examples 1 and 2.

DESCRIPTION OF EMBODIMENTS

Figure 2A:
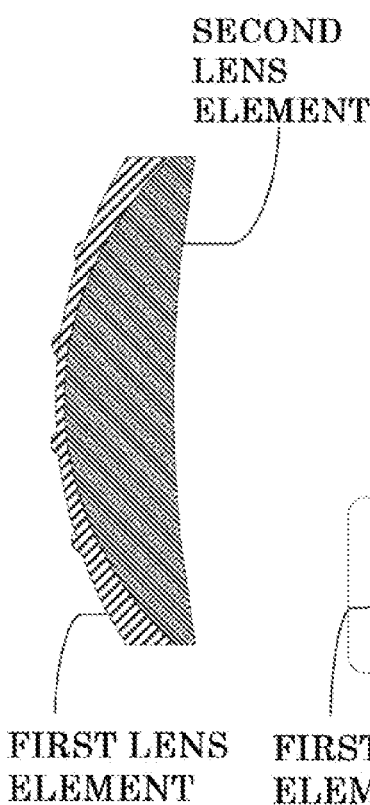
FIGS. 2(a)-2(c) are schematic side cross-sectional views of an eyeglass lens including a first refractive region and a second refractive region described in Patent Document 1 according to a modified example, and the inside of the balloon is an enlarged view.

Hereinafter, one aspect of the present disclosure will be described. The following description is exemplary and the disclosure is not limited to the illustrated embodiments. Note that in this specification, "to" indicates being a predetermined numerical value or more and a predetermined numerical value or less.

Also, the wavelengths of the C'-line, F'-line, and the like stated below are Fraunhofer line wavelengths, and although the wavelength values are rounded after the decimal point, it is possible to refer to the Fraunhofer line wavelengths when accurate values are to be used.

[Ophthalmic Lens According to One Aspect of the Present Disclosure]

The ophthalmic lens according to one aspect of the present disclosure is a refractive error progression suppressing lens. The specific configuration is as follows.

"An ophthalmic lens including two lens elements 1 and 2 having powers with different signs, in which when an Abbe number (e-line reference) of the lens element 1 having a power with a smaller absolute value is $v_{e1}$, and an Abbe number (e-line reference) of the other lens element 2 is $v_{e2}$, Formula 1 below is satisfied, and $$v_{e1} < v_{e2} \qquad \text{(Formula 1)}$$

when a partial dispersion ratio $P'_{gF'1}$ between a g-line and an F'-line in the lens element 1 having the power with the smaller absolute value, and a partial dispersion ratio $P'_{gF'2}$ between a g-line and an F'-line in the other lens element 2 are set, Formula 2 below is satisfied.

$$P'_{gF'1} > P'_{gF'2} \qquad \text{(Formula 2)}"$$

There is no particular limitation on the mode of the "ophthalmic lens" as long as it functions as a near-sightedness progression suppressing lens. Eyeglass lenses or contact lenses (i.e., lenses worn outside the eyeball) are examples of ophthalmic lenses. Although the ophthalmic lens described in the present specification may include an intraocular lens (a so-called IOL), the intraocular lens may be excluded from the ophthalmic lens. In one aspect of the present disclosure, an eyeglass lens is illustrated as an example.

The eyeglass lens has an object-side surface and an eyeball-side surface. The "object-side surface" is a surface located on the object side when eyeglasses including the eyeglass lens are worn by the wearer, and is a so-called outer surface. The "eyeball-side surface" is the opposite, that is, the surface located on the eyeball side when the eyeglasses including the eyeglass lens are worn by the wearer, and is the so-called inner surface. In one aspect of the present disclosure, the object-side surface is a convex surface, and the eyeball-side surface is a concave surface. That is, the eyeglass lens in one aspect of the present disclosure is a meniscus lens.

The "object-side surface side" includes, for example, the outermost surface of the object-side surface of the eyeglass lens, includes the object-side surface of the lens base material that is the base of the eyeglass lens, and includes the object-side surface of the hard coat layer or the like provided on the lens base material. The same applies to the "eyeball-side surface side".

The "power" of lens elements 1 and 2 refers to the refractive power when light passes through each lens element. Since the lens elements 1 and 2 are merely constituent parts of the eyeglass lens, the powers of the lens elements 1 and 2 are different from the prescription power of the eyeglass lens itself.

As the name implies, "visible light" is light that is visible to humans, and is defined in the present specification as light having a wavelength in the range of 360 to 830 nm based on JIS Z 8120 optical terminology.

The "short wavelength side" refers to the short wavelength side of the wavelength range of visible light, refers to less than half the value of the above-described wavelength range, and is less than 595 nm in the above-described wavelength range. The short wavelength side is also referred to as the blue light side.

The "long wavelength side" refers to the long wavelength side of the wavelength range of visible light, refers to half or more of the value of the above-described wavelength range, and is 595 nm or more in the above-described wavelength range. The long wavelength side is also called the red light side.

The eyeglass lens according to one aspect of the present disclosure includes two lens elements 1 and 2 having powers with different signs. Also, the powers of the lens elements 1 and 2 have mutually different absolute values. As shown in FIG. 15 of Patent Document 3 and FIG. 1(b) of the present application according to one working example of the present disclosure, the power of one lens element is positive and the power of the other lens element is negative. Also, in the eyeglass lens according to one aspect of the present disclosure, the lens elements 1 and 2 are joined to each other.

There is no particular limitation on the "lens element" as long as positive or negative power can be realized with a combination of the object-side surface and the eyeball-side surface and the refractive index. There is also no particular limitation on the material of the lens element, and the material used as the lens base material may also be used thereas. Also, in the upper paragraph, an example in which the lens elements 1 and 2 are joined was given, but the present disclosure is not limited thereto. For example, the lens elements 1 and 2 may also be arranged via an interlayer film. In that case, the ophthalmic lens may be manufactured in accordance with the content described in Japanese Patent Application Laid-Open Publication No. 2013-160994.

Note that if the interlayer film is extremely thin, the interlayer film has the approximate interface shape of the lens elements 1 and 2. In that case, the object-side surface and the eyeball-side surface of the interlayer film are almost the same, and positive or negative power is not realized. In terms of numeric values, whether the power provided by the interlayer film is zero or not, the absolute value of the power is at most 0.12 D. In this case, the interlayer film is not included in the lens element.

In one aspect of the present disclosure, a case where the lens elements 1 and 2 are joined is illustrated as an example, but one of the lens elements 1 and 2 may also be in the form of a layer. For example, if the lens element 2 is a lens base material, the lens element 1 may also be a film laminated on the lens base material.

In the eyeglass lens according to one aspect of the present disclosure, when the Abbe number (e-line reference) of the lens element 1 having a power with a smaller absolute value is $v_{e1}$, and the Abbe number (e-line reference) of the other lens element 2 is $v_{e2}$, the following Formula 1 is satisfied. The e-line has a wavelength of 546 nm.

$$v_{e1} < v_{e2} \tag{Formula 1}$$

Then, when a partial dispersion ratio $P'_{gF'1}$ between the g-line and the F'-line in the lens element 1 having the power with the smaller absolute value, and a partial dispersion ratio $P'_{gF'2}$ between the g-line (wavelength 436 nm) and the F'-line (wavelength 480 nm) in the other lens element 2 are set, the following Formula 2 is satisfied.

$$P'_{gF'1} > P'_{gF'2} \tag{Formula 2}$$

The partial dispersion ratio is a value obtained by dividing the partial dispersion by the main dispersion, and in the present specification, a value obtained by subtracting the refractive index $n_{C'}$ at the C'-line (wavelength 644 nm) from the refractive index $n_{F'}$ at the F'-line (wavelength 480 nm) is used as the main dispersion. When $n_g$ is the refractive index at the g-line (wavelength 436 nm) and $n_{F'}$ is the refractive index at the F'-line (wavelength 480 nm), $P'_{gF'}$ is expressed by the following formula.

$$P'_{gF'} = (n_g - n_{F'})/(n_{F'} - n_{C'}) \tag{Formula 3}$$

That is, $P'_{gF'1}$ represents the partial dispersion ratio between the g-line and the F'-line in the lens element 1, and $P_{gF'2}$ represents the partial dispersion ratio between the g-line and the F'-line in the lens element 2.

By combining the above-described lens elements 1, 2, Formula 1, and Formula 2, as shown in the plots of Working Examples 1 and 2 shown in later-described FIG. 4, the focus position of a luminous flux with a wavelength on the short wavelength side among a bundle of visible light rays that pass through the eyeglass lens and pass through the pupil moves significantly to the overfocus side compared to Comparative Example 1 (single lens made of crown glass). On the other hand, the focus position of a luminous flux with a wavelength on the long wavelength side does not change much compared to Comparative Example 1 (single lens made of crown glass) and approaches the retina.

That is, in the case of the eyeglass lens according to one aspect of the present disclosure, when the refractive error progression suppressing effect is exhibited due to longitudinal chromatic aberration, the number of factors that hinder the suppressing effect is reduced. Furthermore, since the number of factors that hinder the suppressing effect in the longitudinal chromatic aberration itself is reduced, it is not necessary to provide filtering (a so-called wavelength filter) as described in Patent Document 2. As a result, it is also not necessary to significantly reduce the luminous flux with a wavelength on the short wavelength side, and it is possible to suppress a decrease in resolution.

[Details of Eyeglass Lens According to One Aspect of the Present Disclosure]

Hereinafter, further specific examples, preferred examples, and modified examples of one aspect of the present disclosure will be described.

The type of the eyeglass lens according to one aspect of the present disclosure is not particularly limited, and examples thereof include a single focus lens. The eyeglass lens according to one aspect of the present disclosure is a single focus lens corresponding to an object distance of an intermediate distance (1 m to 40 cm) or a near distance (40 cm to 10 cm). Of course, the technical idea of the present disclosure can be applied even to a single focus lens corresponding to an infinite distance, but as one aspect of the present disclosure, a single focus lens corresponding to a medium-near distance will be illustrated as an example.

Note that the eyeglass lens according to one aspect of the present disclosure may also be a bifocal lens having two focal points or a trifocal lens having three focal points. Also, the eyeglass lens may be a progressive refractive power lens including a near portion corresponding to a near distance, a far portion corresponding to a distance farther than the near distance, and an intermediate portion having a progressive action connecting the near portion and the far portion.

It is preferable that when the absolute value of the power of the lens element 1 is D1 and the absolute value of the power of the lens element 2 is D2, Formula 3 below is satisfied.

$$(D1/v_{e1}) < (D2/v_{e2}) \tag{Formula 3}$$

By satisfying Formula 3, chromatic aberration on the retina of the luminous flux with a wavelength "other than" the wavelength on the short wavelength side among the bundle of visible light rays that pass through the eyeglass lens and pass through the pupil is reduced compared to when the eye is naked.

It is preferable that when the absolute value of the power of the lens element 1 is D1 and the absolute value of the power of the lens element 2 is D2, Formula 4 below is satisfied.

$$\{D1 \times (1 + 3 \times P'_{gF'1})/v_{e1}\} > \{D2 \times (1 + 3 \times P'_{gF'2})/v_{e2}\} \tag{Formula 4}$$

By satisfying Formula 4, chromatic aberration of blue light having a wavelength of 453 nm (defocusing of the e-line, i.e., light with a wavelength of 546 nm) is increased compared to when the eye is naked. The wavelength of 453 nm is a wavelength at which the sensitivity of S-cone cells exceeds the sensitivity of other cone cells and rod cells, and thereby light on the shorter wavelength side is more likely to be strongly perceived as blue light by the S-cone cells. Accordingly, it is preferable to give an action of focusing light in front of the retina at a short wavelength of 453 nm or less.

The derivation process of Formula 4 above will be described.

First, Formula 4 relates to the secondary spectrum mentioned in [Solution to the Problem]. That is, Formula 4 is a specific example for increasing longitudinal chromatic aberration, which is the exact opposite of superachromatization such as apochromat, and focusing the light in front of the retina on the short wavelength side (g-line to F'-line).

The plot of chromatic aberration $\Delta D$, which is a secondary spectrum, is a quadratic function with respect to the reciprocal of the wavelength (set as K). The quadratic function is set as $\Delta D = aK^2 + bK + c$. In addition, the following formula is set.

Condition that Provides Positive Chromatic Aberration with Blue Light (Defocusing with Respect to the e-Line)

$$\{a(1/453)^2 + b(1/453)^2 + c\} - \{a(1/546)^2 + b(1/546)^2 + c\} > 0 \quad \text{(Formula 5)}$$

Relational Expression of Chromatic Aberration of F'-Line and C'-Line (Primary Chromatic Aberration)

$$\{a(1/480)^2 + b(1/480)^2 + c\} - \{a(1/644)^2 + b(1/644)^2 + c\} > \{(D1/\nu_{e1}) - (D2/\nu_{e2})\} \quad \text{(Formula 6)}$$

Relational Expression of Chromatic Aberration (Secondary Spectrum) of g-Line and F'-Line $$\{a(1/453)^2 + b(1/453)^2 + c\} - \{a(1/480)^2 + b(1/480)^2 + c\} > \{(D1/\nu_{e1}) \times P'_{gF'1} - (D2/\nu_{e2}) \times P'_{gF'2}\} \quad \text{(Formula 7)}$$

When Formula 6 and Formula 7 are substituted into Formula 5, Formula 8 below is obtained.

$$\{(D1/\nu_{e1}) - (D2/\nu_{e2})\} + 3.01 \times \{(D1/\nu_{e1}) \times P'_{gF'1}\} - \{(D2/\nu_{e2}) \times P'_{gF'2}\} > 0 \quad \text{(Formula 8)}$$

The above-described Formula 4 is obtained by rounding down the decimals in Formula 8.

$$\{D1 \times (1 + 3 \times P'_{gF'1})/\nu_{e1}\} > \{D2 \times (1 + 3 \times P'_{gF'2})/\nu_{e2}\} \quad \text{(Formula 4)}$$

If the power of the lens element 1 is positive and the power of the lens element 2 is negative, the near-sightedness progression suppressing effect can be obtained. In this case, preferably, the prescription power of the ophthalmic lens is negative, and the ophthalmic lens is a minus lens. This is because people who need the near-sightedness progression suppressing effect are often already near-sighted, and a minus lens can correct this near-sightedness.

Incidentally, the prescription data of the wearer information is written on a lens bag (a specification sheet in the case of contact lenses). That is, if there is a lens bag, it is possible to specify the lens as an ophthalmic lens based on the prescription data of the wearer information. Also, an ophthalmic lens is usually in a set with a lens bag or a specification sheet. For this reason, the technical idea of the present disclosure is reflected in an ophthalmic lens to which a lens bag or a specification sheet is attached, and the same applies to a set of a lens bag and an ophthalmic lens.

If the power of the lens element 1 is negative and the power of the lens element 2 is positive, a far-sightedness progression suppressing effect can be obtained. In this case, preferably, the prescription power of the ophthalmic lens is positive, and the ophthalmic lens is a plus lens. This is because people who need the far-sightedness progression suppressing effect are often already far-sighted, and a plus lens can correct this far-sightedness. The far-sightedness progression suppressing effect will be described in [Modified Examples].

Hereinafter, a further specific configuration of the eyeglass lens according to one aspect of the present disclosure will be described.

The eyeglass lens is constituted by including a lens base material, a wavelength filter formed on the convex side of the lens base material, a hard coat film formed on each of the convex side and the concave side of the lens base material, and an antireflection film (AR film) formed on the surface of each hard coat film. Note that in addition to the hard coat film and the antireflection film, other films may further be formed on the eyeglass lens.

(Lens Base Material)

The lens base material is made of, for example, a thermosetting resin material such as polycarbonate, CR-39, thiourethane, allyl, acrylic, or epithio. Among these, polycarbonate is preferable. Note that another resin material according to which a desired refractive index is obtained may also be selected as the resin material constituting the lens base material. Also, a lens base material made of inorganic glass may be used instead of the resin material. In one aspect of the present disclosure, a case is mainly illustrated in which sawtooth-shaped portions are provided on the eyeball-side surface of the lens base material, and the sawtooth-shaped portions are arranged in a plurality of concentric ring shapes centered about the lens center (geometric center or optical center) of the eyeglass lens.

(Hard Coat Film)

The hard coat film is formed using, for example, a thermoplastic resin or a UV curable resin. The hard coat film can be formed using a method of immersing the lens base material in a hard coat liquid, spin-coating, or the like. By performing coating with such a hard coat film, the durability of the eyeglass lens can be improved.

(Anti-Reflection Film)

The anti-reflection film is formed by, for example, forming a film of an anti-reflection agent such as $ZrO_2$, $MgF_2$, or $Al_2O_3$ through vacuum deposition. Due to the coating of such an anti-reflection film, the visibility of an image through the eyeglass lens can be improved. Note that by controlling the material and film thickness of the anti-reflection film, it is possible to control the spectral transmittance, and it is also possible to give the anti-reflection film a function of a wavelength filter.

Modified Examples

Although one aspect of the present disclosure has been described above, the above-described contents of the disclosure indicate an exemplary aspect of the present disclosure. That is, the technical scope of the present disclosure is not limited to the above-described exemplary aspect, and can be modified in various ways without departing from the gist thereof.

Due to the effect provided by one aspect of the present disclosure, the number of factors that hinder the refractive error progression suppressing effect is reduced. For this reason, it is not necessary to provide the filtering (a so-called wavelength filter) as described in Patent Document 2, which is preferable. On the other hand, there is no reason to exclude the provision of the wavelength filter from the technical idea of the present disclosure.

The ophthalmic lens according to one aspect of the disclosure is not limited to being constituted by only the lens elements 1 and 2. Other lens elements may also be combined as long as the effect that one aspect of the present disclosure is to provide can be exhibited.

As described in Patent Document 1, the technical idea of the present disclosure can be applied to an eyeglass lens, and further to an ophthalmic lens, in which a plurality of minute convex portions are formed. Specifically, the ophthalmic lens according to one aspect of the present disclosure further includes the following configurations.

"A first refractive region having a first refractive power obtained based on a prescription for correcting refractive error of an eye; and a plurality of second refractive regions that have a refractive power different from the first refractive power, and have a function of focusing on a position outside of a retina of the eye so as to suppress progression of the refractive error of the eye are included, in which the second refractive regions are formed as respective independent regions near a central portion of the ophthalmic lens, and the first refractive region is formed outside of the regions in which the second refractive regions are formed."

Figure 2B:
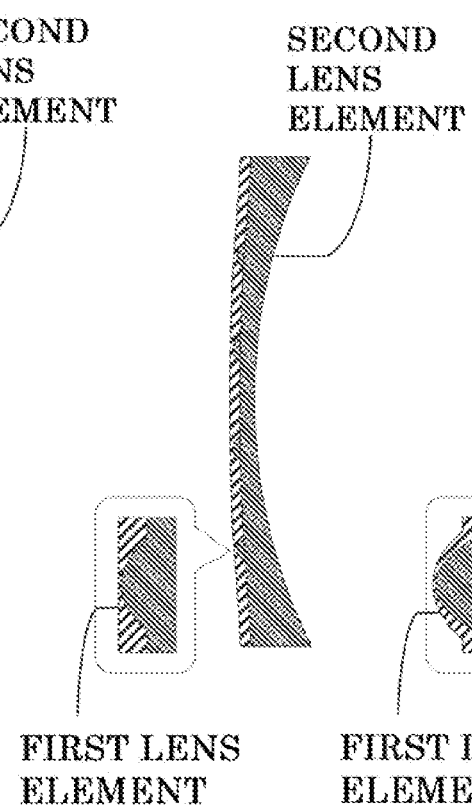
Figure 2C:
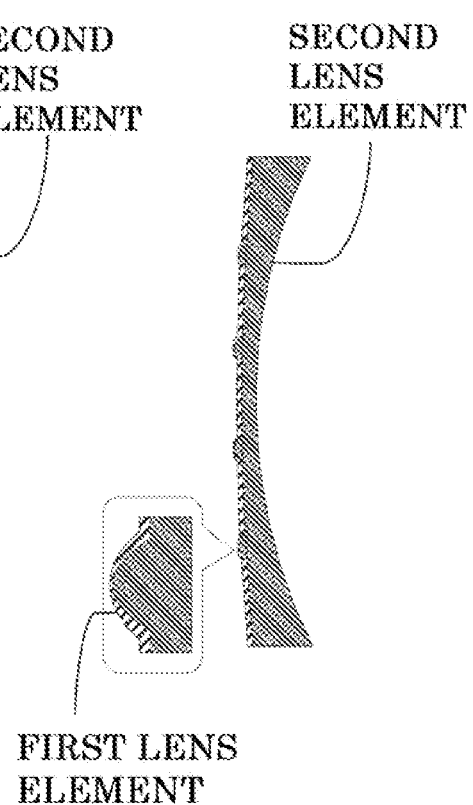

FIGS. 2(a)-2(c) are schematic side cross-sectional views of an eyeglass lens including a first refractive region and a second refractive region described in Patent Document 1 according to a modified example, and the inside of the balloon is an enlarged view.

FIG. 2(a) shows a state in which a film in which minute convex portions (second refractive regions) described in Patent Document 1 are formed is laminated on the object-side surface of the lens element 2, which is a lens base material and has a positive power. Although the eyeglass lens as a whole is a plus lens, it has a near-sightedness progression suppressing effect since the defocus power due to the minute convex portions is exhibited.

FIG. 2(b) shows a state in which minute convex portions are formed on the object-side surface of the lens element 2, which is a lens base material and has a negative power. Then, a state is shown in which a film is laminated so as to embed the minute convex portions on the object-side surface so that the influence of the minute convex portions does not appear on the outermost surface of the eyeglass lens.

In this state, the outermost surface of the eyeglass lens is smooth. Even if the outermost surface is smooth, the near-sightedness progression suppressing effect can be obtained as long as the shapes of the convex portions and concave portions at the interface portion inside of the eyeglass lens and the difference in the refractive index of the two types of surface base materials that sandwich the interface portion are set appropriately.

Note that, as shown in the enlarged view in FIG. 2(b), the portion of the film corresponding to the minute convex portion (second refractive region) has a shape and a thickness that provide a negative power. That is, the lens element in the present specification need only have a positive or negative power at at least a portion thereof.

FIG. 2(c) shows a state in which minute convex portions are formed on the object-side surface of the lens element 2, which is a lens base material and has a negative power. Also, a state is shown in which a film (lens element 1) is laminated on the object-side surface so that the influence of the minute convex portion appears on the outermost surface of the eyeglass lens. Note that, as shown in the enlarged view in FIG. 2(c), the portion of the film corresponding to the minute convex portions (second refractive region) has a shape and a thickness that provide a negative power.

Since the convex regions, which are the minute convex portions, follow the convex regions of the lens base material, similarly to those convex regions, the convex regions are arranged in island shapes at equal intervals in a circumferential direction and an axial direction around the lens center, that is, in a state of being aligned regularly near the lens center.

Each convex region is configured as follows, for example. The diameter of the convex region is preferably about 0.8 to 2.0 mm. The protruding height (protruding amount) of the convex region is preferably about 0.1 to 10 μm, and preferably about 0.7 to 0.9 μm. The radius of curvature of the convex region is preferably a spherical shape that is 50 to 250 mmR, and preferably about 86 mmR. With such a configuration, it is preferable that the refractive power of the convex region is set to be about 2.00 to 5.00 diopters greater than the refractive power of the region where the convex region is not formed.

The other contents relating to the first refractive region and the second refractive region described in Patent Document 1 refer to all of the contents described in Patent Document 1, and thus the description is omitted here.

Figure 3:
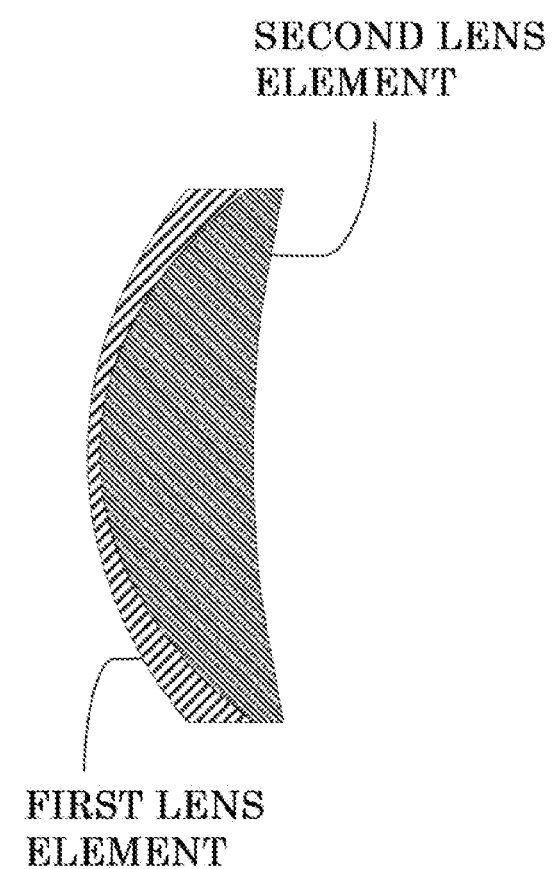
FIG. 3 is a schematic side cross-sectional view of a plus lens for suppressing far-sightedness progression according to a modified example.

FIG. 3 is a schematic side cross-sectional view of a plus lens for suppressing the progression of far-sightedness according to a modified example.

The technical idea of the eyeglass lens of one aspect of the present disclosure can also be applied to an eyeglass lens having a far-sightedness progression suppressing function. Specifically, longitudinal chromatic aberration is provided so as to have the effect of converging the luminous flux at a position B', which is farther from the object side than a position A on the retina (that is, on the underfocus side behind the position A) in the forward direction of light travel. That is, contrary to the above-described one aspect of the present disclosure, the focus position of the luminous flux having a wavelength on the long wavelength side among the bundle of visible light rays that pass through the eyeglass lens and pass through the pupil is moved to the underfocus side by the secondary spectrum. This can be achieved when the power of the lens element 1 is negative and the power of the lens element 2 is positive. Preferably, the prescription power of the ophthalmic lens is positive. Also, when the content of Patent Document 1 is applied and the far-sightedness progression suppressing function is to be provided, "convex" may be read as "concave".

It is also possible to summarize one aspect of the present disclosure as follows.

"An ophthalmic lens including two lens elements having powers with different signs, in which, for light with a wavelength on the long wavelength side in visible light, longitudinal chromatic aberration is set to near zero, and for light with a wavelength on the short wavelength side in visible light, longitudinal chromatic aberration is increased (due to a secondary spectrum), and the power is higher than the prescribed power."

Near zero refers to a state in which the absolute value of the power difference per 80 nm of the wavelength range is 0.01 D or less. This is a localization of the state in which the absolute value of the power difference in the wavelength range from the g-line to the C'-line is 0.02 D or less when the e-line is used as a reference.

Working Examples

Next, working examples will be shown, and the present disclosure will be specifically described. Of course, the present disclosure is not limited to the following working examples.

Comparative Example 1

FIG. 1(a) is a schematic side cross-sectional view of the minus lens according to Comparative Example 1.

An eyeglass lens with a prescription power, that is, a spherical power S, of −4.0 D and an astigmatic power of zero was designed. That is, this eyeglass lens is a single focus minus lens. Also, this eyeglass lens is the lens base material itself, and no film such as a hard coat layer is formed thereon. The lens base material is crown glass, and its refractive index (e-line reference) is 1.525. Also, the Abbe number (e-line reference) was 58.62, and the partial dispersion ratio between the g-line and the F'-line was 0.541.

Figure 4:
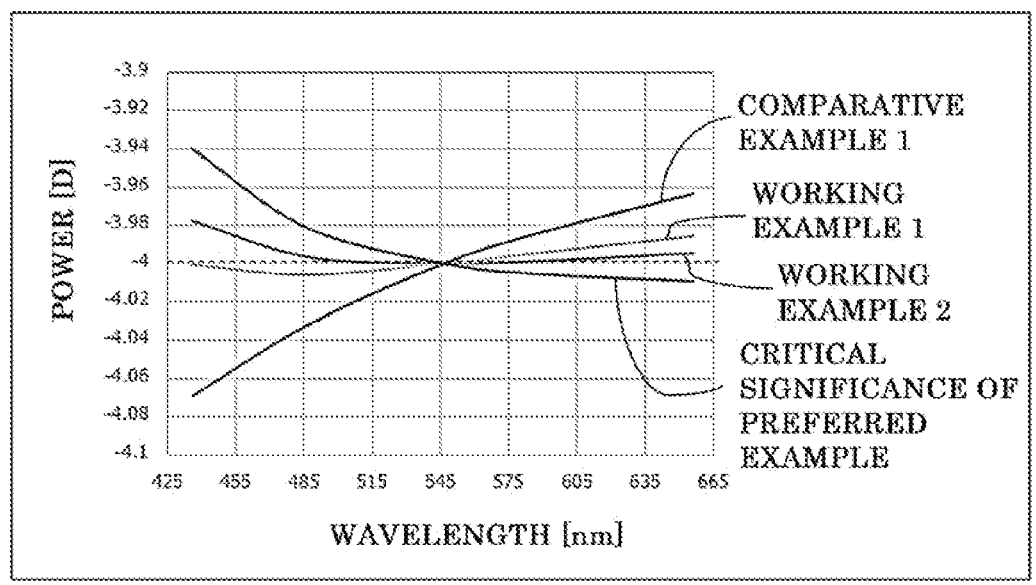
FIG. 4 is a plot showing changes in the power of the eyeglass lens due to light of each wavelength in Comparative Example 1 and Working Examples 1 and 2 when the horizontal axis is the wavelength [nm] and the vertical axis is the power [D]. Note that a plot showing the critical significance of the preferred example is also shown in the drawing.

FIG. 4 is a plot showing changes in the power of the eyeglass lens due to each wavelength light in Comparative Example 1 and Working Examples 1 and 2 when the horizontal axis is the wavelength [nm] and the vertical axis is the power [D]. Note that a plot showing the critical significance of the preferred example is also shown in the drawing.

Note that in Comparative Example 1 and Working Examples 1 and 2 described later (and furthermore, a plot of the critical significance of a preferred example), the plot was set such that the power of the eyeglass lens when the e-line (wavelength 546 nm) passes therethrough is −4.0 D. This is called an e-line reference.

Working Example 1

FIG. 1(b) is a schematic side cross-sectional view of the minus lens for suppressing the progression of near-sightedness according to Working Examples 1 and 2.

Working Examples 1 and 2 are eyeglass lenses for suppressing the progression of near-sightedness. The lens elements 1 and 2 according to Working Example 1 were set as follows. $n_{e1}$ is the refractive index of the lens element 1 with reference to the e-line, and $n_{e2}$ is the refractive index of the lens element 2 with reference to the e-line.

Lens element 1: Power is positive
$n_{e1}$: 2.0009
$v_{e1}$: 16.72
$P'_{gF'1}$: 0.588
D1: 4.1 [D]
Lens element 2: Power is negative
$n_{e2}$: 1.8656
$v_{e2}$: 30.23
$P'_{gF'2}$: 0.529
D2: −8.1 [D]

Working Example 2

The lens elements 1 and 2 according to Working Example 2 were set as follows. Note that Working Example 2 is a preferable example that satisfies Formula 4 above.

Lens element 1: Power is positive
$n_{e1}$: 2.00009
$v_{e1}$: 16.72
$P'_{gF'1}$: 0.588
D1: 4.8 [D]
Lens element 2: Power is negative
$n_{e2}$: 1.86560
$v_{e2}$: 30.23
$P'_{gF'2}$: 0.529
D2: −8.8 [D]

Critical Significance of Preferred Example

The lens elements 1 and 2 related to the critical significance of the preferred example satisfying Formula 3 above were set as follows.

Lens element 1: Power is positive
$n_{e1}$: 2.0009
$v_{e1}$: 16.72
$P'_{gF'1}$: 0.588
D1: 5.8 [D]
Lens element 2: Power is negative
$n_{e2}$: 1.86560
$v_{e2}$: 30.23
$P_{gF'2}$: 0.529
D2: −9.8 [D]

<Review>

As shown in FIG. 4, in Working Examples 1 and 2, a light ray on the short wavelength side (a light ray having a wavelength smaller than 546 nm) was shifted in the direction in which the power is positive, compared to Comparative Example 1. This indicates that the focus position of the luminous flux on the short wavelength side that passes through the eyeglass lens and passes through the pupil moves to the overfocus side.

On the contrary, the light on the long wavelength side (i.e., the light on the red light side, or light rays having a wavelength greater than 546 nm) was shifted in the direction in which the power is negative. This indicates that when the effect of suppressing the progression of refractive error is exhibited due to longitudinal chromatic aberration, the number of factors that hinder the suppressing effect was reduced.

In Working Example 2, the effect of moving the luminous flux focus position on the short wavelength side to the front of the retina is greater than that in Working Example 1. At the same time, in Working Example 2, the focus position of the luminous flux on the long wavelength side can be brought closer to the retina than in Working Example 1. If the focus position of the luminous flux on the long wavelength side is on the underfocus side, the near-sightedness progression suppressing effect is hindered. On the other hand, bringing the focus position of the luminous flux on the long wavelength side closer to the retina means reducing this inhibitory factor.

Regarding the plot of the critical significance of the preferred example, in the plot, the focus position of the luminous flux on the long wavelength side that passes through the eyeglass lens and passes through the pupil moves to the underfocus side. This plot is a plot obtained in the case where Formula 3 above is made into an equation. Ultimately, it is preferable to adopt a combination of lens elements 1 and 2 such that the plot is arranged between that plot and the plot of Comparative Example 1. That is, it is preferable to satisfy Formula 3 above.

SUMMARY

The following is a summary of the "ophthalmic lens" disclosed in the present disclosure.

A working example of the present disclosure is as follows.

"An ophthalmic lens including two lens elements 1 and 2 having powers with different signs, in which when an Abbe number (e-line reference) of the lens element 1 having a power with a smaller absolute value is $v_{e1}$, and an Abbe number (e-line reference) of the other lens element 2 is $v_{e2}$, Formula 1 below is satisfied, and $$v_{e1} < v_{e2} \quad \text{(Formula 1)}$$

when a partial dispersion ratio $P'_{gF'1}$ between a g-line and an F'-line in the lens element 1 having the power with the smaller absolute value, and a partial dispersion ratio $P'_{gF'2}$ between a g-line and an F'-line in the other lens element 2 are set, Formula 2 below is satisfied.

$$P'_{gF'1} > P'_{gF'2} \quad \text{(Formula 2)}".$$

The invention claimed is:

1. An ophthalmic lens including two lens elements 1 and 2 having powers with different signs, wherein when an Abbe number (e-line reference) of the lens element 1 having a power with a smaller absolute value is $\nu_{e1}$, and an Abbe number (e-line reference) of the other lens element 2 is $\nu_{e2}$, Formula 1 below is satisfied, $$\nu_{e1} < \nu_{e2} \quad \text{(Formula 1), and}$$

when a partial dispersion ratio $P_{gF'1}$ between a g-line and an F'-line in the lens element 1 having the power with the smaller absolute value, and a partial dispersion ratio $P_{gF'2}$ between a g-line and an F'-line in the other lens element 2 are set, Formula 2 below is satisfied, $$P'_{gF'1} > P'_{gF'2} \quad \text{(Formula 2),}$$

wherein when the absolute value of the power of the lens element 1 is D1 and the absolute value of the power of the lens element 2 is D2, Formula 3 below is satisfied, $$(D1/\nu_{e1}) < (D2/\nu_{e2}) \quad \text{(Formula 3)}$$

wherein when the absolute value of the power of the lens element 1 is D1 and the absolute value of the power of the lens element 2 is D2, Formula 4 below is satisfied, $$\{D1 \times (1+3 \times P'_{gF'1})/\nu_{e1}\} > \{D2 \times (1+3 \times P'_{gF'2})/\nu_{e2}\} \quad \text{(Formula 4).}$$

2. The ophthalmic lens according to claim 1, wherein the power of the lens element 1 is positive, and the power of the lens element 2 is negative.

3. The ophthalmic lens according to claim 1, wherein the power of the lens element 1 is negative, and the power of the lens element 2 is positive.

4. The ophthalmic lens according to claim 1, comprising a first refractive region having a first refractive power obtained based on a prescription for correcting refractive error of an eye; and a plurality of second refractive regions that have a refractive power different from the first refractive power, and have a function of focusing on a position outside of a retina of the eye so as to suppress progression of the refractive error of the eye, wherein the second refractive regions are formed as respective independent regions near a central portion of the ophthalmic lens, and the first refractive region is formed outside of the regions in which the second refractive regions are formed.

5. The ophthalmic lens according to claim 1, wherein the ophthalmic lens is an eyeglass lens.

\* \* \* \* \*